J. F. WATERS.
MEAT SAW.
APPLICATION FILED MAR. 23, 1910. RENEWED FEB. 1, 1912.

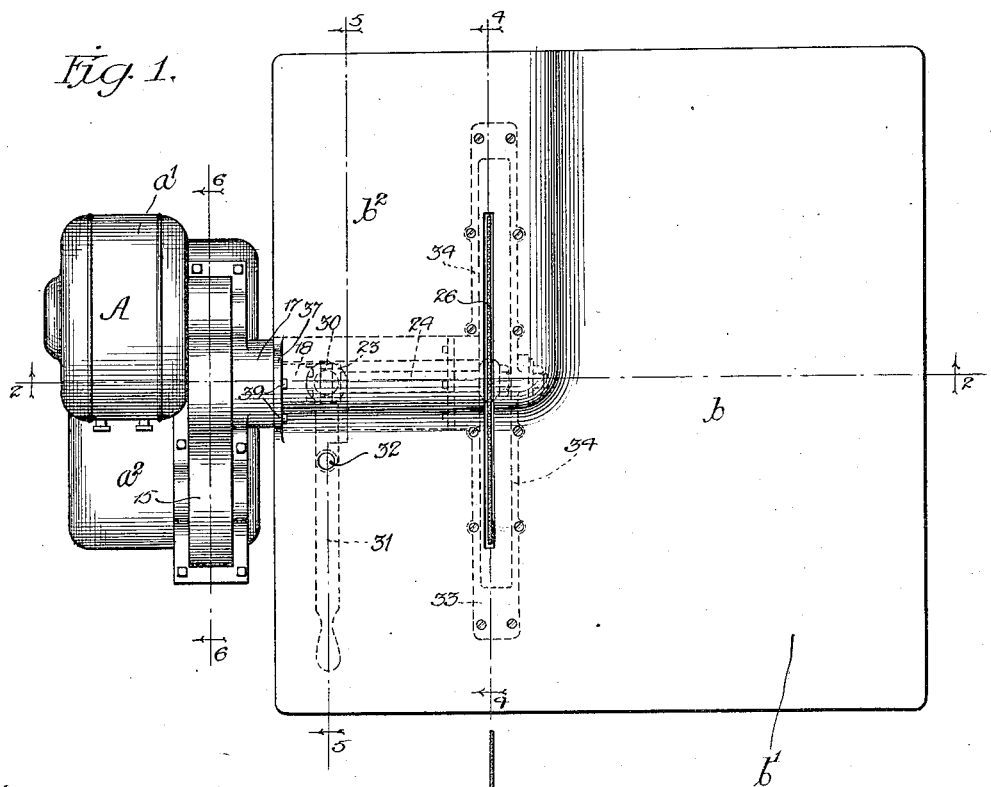

1,033,969.

Patented July 30, 1912.
2 SHEETS—SHEET 2.

UNITED STATES PATENT OFFICE.

JOHN F. WATERS, OF CHICAGO, ILLINOIS.

MEAT-SAW.

1,033,969. Specification of Letters Patent. Patented July 30, 1912.

Application filed March 23, 1910, Serial No. 551,173. Renewed February 1, 1912. Serial No. 674,832.

*To all whom it may concern:*

Be it known that I, JOHN F. WATERS, a resident of Chicago, in the county of Cook and State of Illinois, have invented certain new and useful Improvements in Meat-Saws, of which the following is a full, clear, and exact description.

The present invention designs to provide an improved power-driven rotary meat-saw for the use of butchers.

It is now common practice in large establishments to employ band saws for sawing the bones of meat. These saws are, however, not well adapted for use in small establishments, being too cumbersome, and the invention designs to provide an improved rotary saw, which is adapted to be connected to and driven by an electric motor, with which many smaller butcher shops are provided for operating meat grinders and other devices.

The invention consists in the several novel features hereinafter set forth and more particularly defined by claim at the conclusion hereof.

Figure 4:
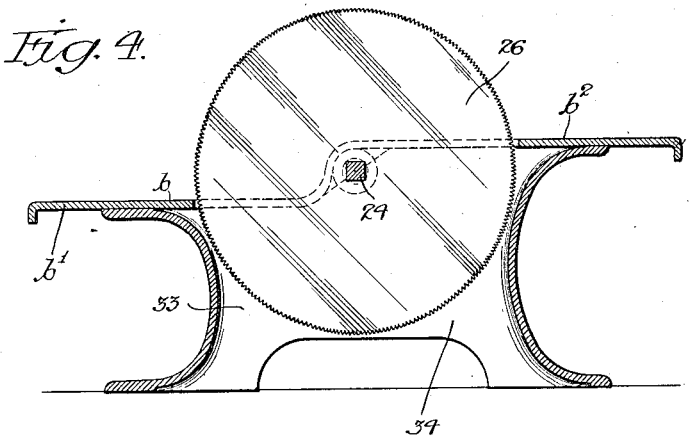
Figure 5:
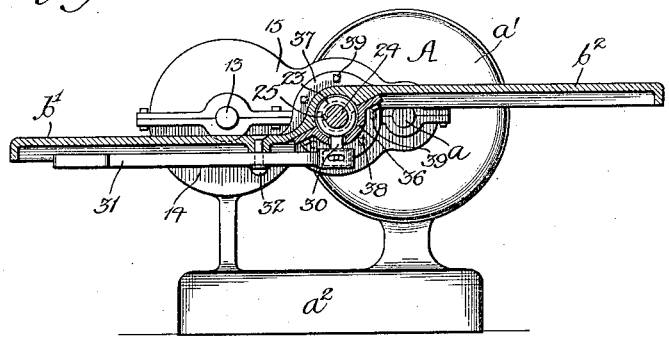
Figure 6:
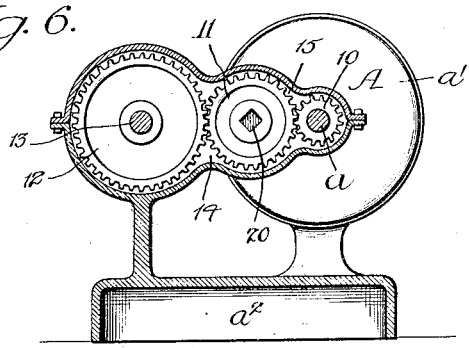

In the drawings: Figure 1 is a plan of a meat-saw, embodying the invention. Fig. 2 is a section taken on line 2—2 of Fig. 1. Fig. 3 is a detail of the saw-shaft. Fig. 4 is a transverse section on line 4—4 of Fig. 1. Fig. 5 is a section taken on line 5—5 of Fig. 1, and Fig. 6 is a section taken on line 6—6 of Fig. 1.

The improved saw is adapted for connection to an electric motor A, which may be of any suitable construction. The armature-shaft $a$ of the motor is provided with a pinion 10 meshing with a gear-wheel 11, which in turn meshes with a larger gear-wheel 12. The motor is inclosed in a suitable case $a'$ which is mounted on a suitable base $a^2$ adapted to rest on a block or table. Gear 12 is adapted to operate a meat-grinder or other device which is to be driven at a slower speed than the saw, and is secured to a shaft 13 which is mounted in a suitable case 14, which incloses all of the gear-mechanism, being provided with a removable section or cover 15 which permits access to the parts. The intermediate gear 11 is secured to a stud or short shaft 16 which is journaled in a bearing 17 formed in the case 15 and this bearing extends beyond the outer end of shaft 16, so that the inner end of a clutch-member 18 may be held therein in accurate alinement with the gear-shaft 16. This clutch-member is provided at its end with a reduced square terminal 19, fitting into a correspondingly shaped socket 20 in shaft 16, so that the clutch-member, when connected to said shaft, will be driven thereby. This connection between said clutch-member and the gear-shaft 16 permits clutch-member 18 to be disconnected from the gear-shaft 16, whenever the saw is not used. The outer end of clutch-member 18 is provided with clutch-teeth 21 adapted to mesh with corresponding clutch-teeth 22 on a clutch-collar 23, which is slidably mounted on a saw-shaft 24 and connected thereto, so as to rotate the shaft by a key 25 secured to the shaft. A circular saw 26 is secured adjacent to the center end of shaft 24 by a suitable clamp 27 and the outer terminal 28 of the saw-shaft is mounted in a ball-bearing 29. When the motor is driven and the clutch-members are connected, as shown in Fig. 2, the motor will continuously rotate the saw-blade 26. A shifter fork 30 is connected to the end of a lever 31 which is pivotally connected, as at 32, to the underside of the saw-table. Shifter 30 engages a groove in the clutch-collar 23, and by shifting this lever 31, which is disposed under the saw-table, the clutch-collar 23 may be shifted longitudinally on the saw-shaft and into and out of engagement with the clutch-member 18.

A saw-table $b$ is provided for holding the meat, while it is being moved across the rotating saw-blade. This table is mounted on a frame 33 having lugs adapted to support the table in proper relation to the motor and gear-case 15. Ball-bearing 29 for the outer end of the saw-shaft is carried by this frame, which comprises sides 34, which form, in effect, a housing for that portion of the rotary saw, which is disposed beneath the meat-table. The front and outer portion $b'$ of the table $b$ is disposed below the axis of the saw-shaft and the inner rear portion is vertically offset with respect to the front portion of the table and over-lies, as at $b^2$, the saw-shaft. As a result of this formation of the table, a deep cut can be made into meat, by moving a loin or other part of an animal, resting on the front portion of the table, toward the rear and the cutting of steaks or loins is greatly facilitated. The outer portion of the table projects beyond the saw and provides a large working-surface for cutting the meat. The table also forms a cover for the saw-shaft beneath it and together with a shell-section 36, forms a housing for inclosing the saw-shaft and clutch-members. This shell and the table are provided with flanges 37 and 38, which are adapted to be removably secured by bolts 39 to the projecting bearing 17 of the gear-case 15. Shell 36 is provided with a lug 40 adapted to enter a groove 41 in clutch-member 18 and hold the latter on the end of the saw-shaft. Resultantly, the saw-table, saw-shaft and clutch provide an attachment, which may be connected to and disconnected from the gear-mechanism of the motor, so that whenever the motor is to be used for some other purpose or the saw is not to be used, bolts 39 may be withdrawn and the entire attachment may be disconnected from the motor. Whenever, it is desired to use the saw, it is merely necessary to place the end of the table in proper relation to the gear-case 15 and insert clutch-member 18 in the bearing 17. Thus, the invention provides a saw-attachment for a motor, which can be readily and conveniently placed into and out of the operative relation to the motor and its gear-mechanism, the frame 33 being adapted to rest on the same block or table on which the motor rests, so that when bolt 39 secures the table to the gear-case, the entire attachment will be in operative relation.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. The combination with a motor, and a casing therefor, of a rotary saw, a shaft for the same, a meat table around the saw, a detachable connection between said shaft and said motor, and a detachable connection between said table and said casing.

2. The combination with a motor, and a casing therefor, of a rotary saw, a shaft for the saw, a meat table around the saw, a detachable connection between said shaft and said motor for driving the saw, and a detachable connection between said table and said casing, said table being removable with the saw.

3. The combination with a motor, and a casing therefor, of a rotary saw, a shaft for the saw, a meat table around the saw, a detachable connection between said shaft and said motor for driving the saw, and a detachable connection between said table and said casing, said table having a portion extending over said shaft and a lower portion at the front of the saw.

4. The combination with a motor, and a casing therefor, of a rotary saw, a shaft for the saw, a meat table around the saw, means for detachably connecting said table and casing, means for detachably and operatively connecting said shaft to the motor comprising a clutch, and a lever mounted under and removable with said table for operating said clutch.

JOHN F. WATERS.

Witnesses:
FRANK W. BEMAN,
HILDUR C. PETERSEN.

---

Copies of this patent may be obtained for five cents each, by addressing the "Commissioner of Patents, Washington, D. C."